Feb. 1, 1955
F. A. WELFEL
2,700,994
CHESTNUT PIERCER
Filed Feb. 23, 1954
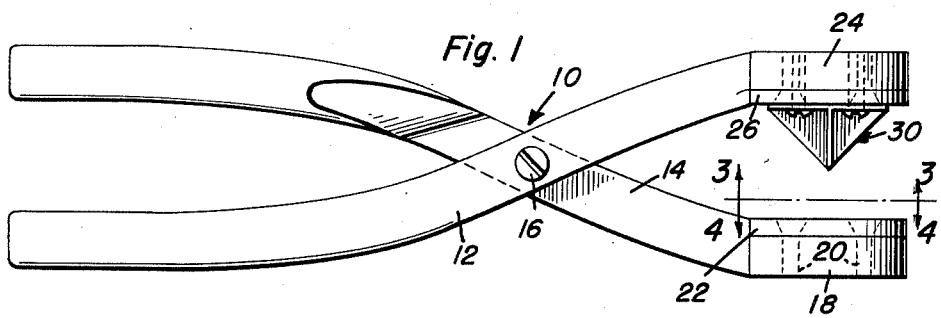
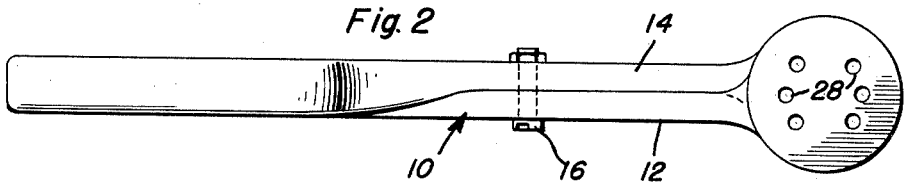
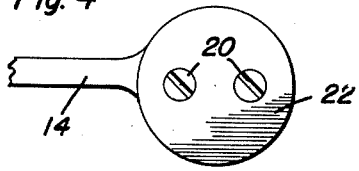
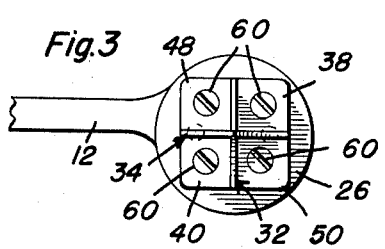
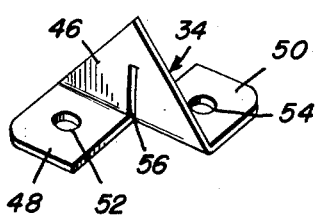
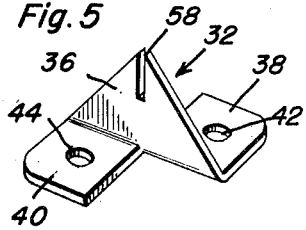
Frank A. Welfel
*INVENTOR.*
BY *Clarence A. O'Brien
and Harvey B. Jackson*
Attorneys United States Patent Office 2,700,994
Patented Feb. 1, 1955

2,700,994

CHESTNUT PIERCER

Frank A. Welfel, New York, N. Y.

Application February 23, 1954, Serial No. 411,936

1 Claim. (Cl. 146—13)

This invention relates in general to improvements in cutting implements, and more specifically to a cutting implement specifically designed for piercing chestnuts.

Due to the moisture contained within a chestnut, when the chestnut is roasted and the shell thereof has not been pierced, there is a tendency for the shell to burst. Not only does this normally scare one standing near such a chestnut, but also there is the possibility that one's eyes may be injured by the bursting of such a chestnut.

Accordingly, it is the primary object of this invention to provide an improved chestnut cutter which may be conveniently utilized to pierce a chestnut shell in order to permit bursting of a chestnut when being roasted.

Another object of this invention is to provide an improved chestnut cutter which includes a cruciform chestnut piercing blade, the blade being of such a nature whereby a chestnut properly pierced therewith may be easily removed from its shell after roasting.

Another object of this invention is to provide an improved chestnut cutter which is formed of readily obtainable materials and is of a simple construction whereby it is economically feasible.

A further object of this invention is to provide an improved blade construction for a chestnut cutter, the blade being of such a nature whereby it may be formed of sheet material and at the same time may produce the desired cut in a shell of a chestnut.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the chestnut cutter which is the subject of this invention and shows the general details thereof;

Figure 2 is a top plan view of the chestnut cutter of Figure 1 and shows the structure of one of the tong members thereof;

Figure 3 is a fragmentary sectional view taken substantially upon the plane indicated by the section line 3—3 of Figure 1 and shows the general configuration of the chestnut piercing blade carried by one of the tong members;

Figure 4 is a fragmentary sectional view taken substantially upon the plane indicated by the section line 4—4 of Figure 1 and shows the general contours of a chestnut seat carried by the other tong member of the tongs;

Figure 5 is an enlarged perspective view of one of the blade elements forming the chestnut piercing blade;

Figure 6 is an enlarged perspective view of another of the blade elements forming the chestnut piercing blade;

Figure 7 is a top perspective view of a chestnut pierced with the chestnut cutter which is the subject of this invention;

Figure 8 is a top perspective view of the chestnut of Figure 7 after it has been roasted.

Referring now to the drawings in detail, it will be seen that there is illustrated a chestnut cutter in the form of a plier-type implement which is the subject of this invention. The chestnut cutter includes tongs which are referred to in general by the reference numeral 10. The tongs 10 include a pair of crossed generally S-shaped handles or tong members 12 and 14 which have forward portions of reduced width and which are pivotally connected together intermediate their ends by a pivot pin 16. The tong member 14 terminates at its forward end in a lower, circular jaw or mounting portion 18. Removably secured to the mounting portion 18 by a pair of fasteners 20 is a metallic disc constituting a chestnut seat 22.

The forward end of the tong member 12 terminates in an upper, circular jaw or mounting portion 24. Removably secured to the mounting portion 24 is a circular plate or disc 26. The circular plate 26 is secured in place by a pair of diametrically opposite fasteners 28.

Removably secured to the mounting portion 24 in the circular plate 26 is a chestnut piercing blade assembly which is referred to in general by the reference numeral 30. The blade assembly 30 includes a first blade element which is referred to in general by the reference numeral 32 and a second blade element which is referred to in general by the reference numeral 34.

The first blade element 32 includes a triangular blade portion 36 which has formed integrally therewith and disposed at one side thereof a mounting flange 38. Also formed integrally with the blade portion 36 but disposed at the side thereof and at the end thereof remote from the mounting flange 38 is a mounting flange 40. It is to be understood that the combined length of the mounting flanges 38 and 40 is equal to the length of the base of the blade portion 36. The mounting flange 38 is provided with a fastener receiving aperture 42 and the mounting flange 40 is provided with a fastener receiving aperture 44.

The blade element 34 has a contour very similar to the blade element 32 and includes a triangular blade portion 46. The blade portion 46 has formed integrally at the base thereof a first mounting flange 48. Also formed integrally with the base of the blade portion 46 is a second mounting flange 50. The second mounting flange 50 is disposed remote from the mounting flange 48 and at an opposite side of the blade portion 46 therefrom. The mounting flange 48 is provided with a fastener receiving aperture 52 and the mounting flange 50 is provided with a fastener receiving aperture 54.

When the blade elements 32 and 34 are properly positioned with respect to each other to form the blade assembly 30, they are in crossed relation so that the blade assembly may be of a cruciform outline. In order to permit this, the blade portion 46 of the blade element 34 is provided with a vertical slot or slit 56 which opens up from the base thereof. The blade element 32 has a vertical slot or slit 58 extending downwardly from the apex of the blade portion 36. As is best illustrated in Figure 3, when the blade elements 32 and 34 are interlocked, they are in crossed relation and include a common apex.

Referring now to Figure 3 in particular, it will be seen that when the blade elements 32 and 34 are in proper position to form the blade assembly 30 and are secured to the circular plate 26, the mounting flanges 38, 40, 48 and 50 are in edge-abutting engagement and form a square. The various mounting flanges are retained in place by fasteners 60 which pass through the plate 26 into the mounting portion 24.

Referring now to Figure 7 in particular, it will be seen that there is illustrated a chestnut 62 which is provided at the top thereof with a cruciform cut 64. In order to accomplish this cut, the chestnut 62 is placed on the seat 22 when the blade assembly 30 is in its uppermost position. Then, the rear portions of the tong members 12 and 14 are squeezed together with the result that the blade assembly 30 moves towards the seat 22 and pierces the top of the chestnut 62.

Referring now to Figure 8 in particular, it will be seen that the chestnut 62 is illustrated after it has been roasted. It will be seen that portions of the shell 66 thereof immediately surrounding the cut 64 have spread upwardly and outwardly so as to facilitate the peeling of the shell 66 from the remainder of the chestnut 62. Therefore, it will be seen that not only does the cutting or piercing of a chestnut prior to its roasting prevent the chestnut from bursting during the roasting process, but also permits the shell thereof to be quickly and easily removed.

From the foregoing, the construction and operation of the device will be readily uderstood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A chestnut cutter comprising: a plier-type implement including a pair of crossed, pivotally connected handles, substantially flat, circular opposed jaws integral with the forward ends of said handles, metallic discs removably mounted on the opposed faces of said jaws, one of said discs providing a seat for a chestnut to be cut, and a pair of crossed and substantially triangular blades removably mounted on the other disc for engagement with the chestnut, one of said blades comprising right angularly and oppositely extending, apertured mounting flanges integral with its base and further having a slot extending downwardly thereinto from the apex thereof for the reception of the other blade, said other blade having a slot extending upwardly thereinto from the base thereof for the reception of said one blade, said other blade further including right angularly and oppositely extending, apertured mounting flanges integral with its base on opposite sides of the slot therein and secured to said other disc in edge-abutting engagement with the first named flanges.

UNITED STATES PATENTS

References Cited in the file of this patent

| | | |
|---|---|---|
| 595,797 | Thomas | Dec. 21, 1897 |
| 883,558 | Moy | Mar. 31, 1908 |
| 1,017,424 | Kwiatkosky | Feb. 13, 1912 |
| 1,040,582 | Royer et al. | Oct. 8, 1912 |
| 1,610,322 | Reich | Dec. 14, 1926 |